United States Patent [19]

Wedding

[11] 4,290,794
[45] Sep. 22, 1981

[54] METHOD OF MAKING COLORED PHOTOCHROMIC GLASSES

[75] Inventor: Brent M. Wedding, Corning, N.Y.

[73] Assignee: Corning Glass Works, Corning, N.Y.

[21] Appl. No.: 95,436

[22] Filed: Nov. 19, 1979

[51] Int. Cl.$^3$ .............................................. C03C 3/20
[52] U.S. Cl. ...................................... 65/30.11; 65/31; 65/33; 501/61; 501/62
[58] Field of Search ............ 65/30 R, 31, 33, DIG. 2; 106/53, DIG. 6

[56] References Cited

U.S. PATENT DOCUMENTS

| | | | |
|---|---|---|---|
| 3,892,582 | 7/1975 | Simms | 65/30 R X |
| 4,036,624 | 7/1977 | Krohn et al. | 65/30 R |
| 4,043,781 | 8/1977 | DeMunn et al. | 65/33 X |

Primary Examiner—Arthur D. Kellogg
Attorney, Agent, or Firm—Clinton S. Janes, Jr.

[57] ABSTRACT

The instant invention is concerned with a method for producing shades of a tint in a photochromic glass, the hue of which will be essentially permanent even after subjecting the glass to temperatures up to about the strain point of the glass. Silver halide crystals constitute the photochromic agents, the glass contains lead, and the method contemplates exposing such a glass to a gaseous reducing atmosphere at temperatures above the strain point of the glass to cause the reduction of silver ions to metallic silver and the reduction of lead ions to metallic lead which coats or alloys with the metallic silver.

11 Claims, 6 Drawing Figures

METHOD OF MAKING COLORED PHOTOCHROMIC GLASSES

BACKGROUND OF THE INVENTION

The manufacture of photochromic glasses or phototropic glasses, as such have been variously termed, had its genesis in U.S. Pat. No. 3,208,860. As is explained therein, photochromic glasses demonstratethe capability of darkening, i.e., changing color, when subjected to actinic radiation, normally ultraviolet radiation, and then returning to their original transmission when removed from the source of actinic radiation. By far the largest application for this type of glass has been in the opthalmic field. Thus, for example, photochromic ophthalmic lenses can exhibit a transmittance of in excess of 90% when worn indoors, but, when the wearer steps outside into the sunlight, the lenses can quickly darken to transmittances well below 50%. Upon returning indoors, the lenses fade to their original transmittance.

Although other photochromic agents are known, the only commercially-marketed glasses have utilized crystals of silver halides and, particularly, crystals of AgCl and AgBr as the photochromic materials. Likewise, whereas other base glass compositions have been investigated with some success, the only commercially-marketed glasses have contained substantial amounts of silica. In general, the commercial glasses have had base compositions within the alkali metal aluminoborosilicate system. U.S. Pat. No. 3,208,860, supra, explicity refers to those compositions containing silver halide crystals as being the preferred embodiment.

The additive of such transition metal oxides as $CoO$, $NiO$, $Cr_2O_3$, $CuO$, $Fe_2O_3$, $V_2O_5$, and $MnO$ and rare earth metal oxides such as $Pr_2O_3$ and $Er_2O_3$ to glass compositions to impart color thereto is well-known to the art. Ophthalmic lenses, including photochromic lenses, tinted in that manner are presently available commercially. Nevertheless, as is apparent, that method of tinting involves the careful addition of such colorants in precisely-controlled amounts in order to insure uniform coloring from piece-to-piece and melt-to-melt. Moreover, that procedure can demand precise regulation of redox conditions during melting and forming of the glass. Accordingly, a method whereby a desired color could be imparted to a glass without the need for specific colorant additions would obviously be highly attractive from a practical point of view. It will be appreciated that, where ophthalmic lenses are the products involved, the tinting process should not deleteriously affect the photochromic behaviour of the glass. Furthermore, in that application where the lenses must be chemically strengthened or thermally tempered, the color must be of such permanence that it will be retained within the glass after exposure to one of those strengthening practices.

U.S. Pat. Nos. 3,892,582 and 3,920,463 are explicity drawn to developing a tint in photochromic glasses wherein silver halide crystals constitute the photochromic agents. The former patent describes subjecting photochromic glass articles having compositions encompassed within U.S. Pat. No. 3,208,860, supra, to a reducing atmosphere, customarily containing hydrogen, for periods of time ranging from about 15 minutes at 300° C. to about 4–5 minutes at 600° C. Strict observance of those heat treating parameters is demanded because of the coloring mechanism involved.

Thus, the patent notes that in almost all photochromic glasses there is inherently an excess of the active photochromic element present. Hence, in the cited compositions, there would be an excess of silver halide crystals. The inventive reduction process is designed to act upon the photochromic agent and, preferably, only upon the excess thereof such that there will be no substantial degradation of photochromic behavior. Where a slight decrease in photochromic characteristics can be tolerated, however, reduction of part of the active photochromic element can be permitted. Nevertheless, the patent explicitly warns against the use of temperatures that are too high for periods of time that are too long, since the photochromic agent will be reduced to such an extent that the desired photochromic behavior in the glass will be lost. Finally, there is a specific caveat against utilizing reducing conditions that are so severe that oxides in the base glass compositions are reduced.

U.S. Pat. No. 3,920,463 is directed to the same basic reduction process but discloses subsequently exposing the so-reduced glasses to ultraviolet radiation. This exposure is stated to produce darker and deeper tints than can be achieved via the reduction treatment alone.

U.S. Pat. No. 4,118, 214 discloses an improvement in the method for producing polychromatic glasses. The conventional process for preparing such glasses comprised two sequences of exposure to high energy or actinic radiation followed by a heat treatment in air. The invention disclosed in the patent involved replacing the second exposure and heat treatment in air with a heat treatment conducted in a reducing environment at a temperature of at least 350° C., but below the strain point of the glass.

The desired coloration in polychromatic glass results from the presence of color centers therein, those color centers consisting of microcrystals of an alkali metal fluoride (customarily NaF) containing a silver halide selected from the group of AgCl, AgBr, and AgI having metallic silver deposited within or upon the surface of the microcrystals. Those glasses consisted essentially of $Na_2O$, Ag, F, a halide selected from the group of Cl, Br, and I, and, optionally, $Al_2O_3$ and/or ZnO.

An atmosphere of hydrogen was stated to be the most effective reducing environment although other agents were asserted to be operable. The use of temperatures at or above the strain point of the glass was to be avoided since such temperatures destroyed the color centers.

As is evident from the discussion of the above three patents, coloration in photochromic and polychromatic glasses was achieved by reducing silver ions to metallic silver. Such coloration is essentially a relatively low temperature process, i.e., temperatures below the strain point will be employed or very brief exposures at higher temperatures may be operable.

The Food and Drug Administration has adopted strength standards for ophthalmic ware such that glass products for that application must either be thermally tempered or chemically strengthened to pass those standards. Thermal tempering contemplates heating a glass article to a temperature at or approaching the softening point of the glass and then quickly chilling it. Chemical strengthening comprehends contacting a glass article (commonly containing alkali metal ions) with a source of larger-sized ions (usually an alkali metal ion of a larger ionic radius) at an elevated temperature below the strain point of the glass for a period of time sufficient to cause the larger ions to migrate into the glass surface and replace the smaller ions present therein. This ion exchange reaction is conventionally undertaken for several hours, frequently overnight.

Both of those processes have the adverse side effect of altering the color or hue developed in the glass through the reduction of silver ions. This situation can be remedied, of course, by conducting the strengthening operation prior to subjecting the glass to the reduction heat treatment. However, that remedy runs counter to the present stream of production since the glass strengthening process is now undertaken immediately before the lenses are inserted into the customers's frames. Moreover, the heating required during the reduction treatment would modify the strength developed via the thermal tempering or chemical strengthening technique.

Yet, the production of glasses having various tints has been sought by wearers of eyeglasses. For example, sportsmen have purchased the so-called shooter's glass, which has a yellow tint, for use as both prescription and non-prescription lenses. The utility of such a product to reduce haze and glare observed by the wearer, lies in designing and maintaining the tint within a narrow range of transmittances. An ideal product would combine a tint having a closely-controlled transmittance in a glass demonstrating photochromic behavior, this tint demonstrating excellent thermal stability, i.e., it will be essentially unaffected by long term heat treatments at temperatures in the vicinity of the strain point of the glass or by short term exposures to heat treatments approaching the softening point of the glass.

OBJECTIVES OF THE INVENTION

The principal objective of the instant invention is to provide means for producing in a single photochromic glass composition several shades of a given tint, the differences in coloration being due to a major variation in luminous transmittance with a minor shift in chromaticity and the hues of which demonstrate excellent thermal stability.

A specific objective of the invention is to provide means for producing in a single photochromic glass composition several shades of a yellow tint and for adjusting the luminous transmittances of the glass to a desired level, the shades demonstrating excellent thermal stability.

Another specific objective of the invention is to produce a photochromic glass body having relatively fixed color coordinates but a controlled transmittance gradient across the face thereof, the color exhibiting excellent thermal stability.

Yet another specific objective of the invention is to produce a semi-finished lens of photochromic glass exhibiting a color in one surface of the lens which demonstrates excellent thermal stability.

Still another objective of the invention is to produce a photochromic glass body which can be highly absorbing of radiation having wavelengths below about 450 nm and exhibits a color demonstrating excellent thermal stability.

A final objective of the invention is to produce a photochromic glass body containing a conventional glass colorant in the composition thereof, the hue of which can be modified to yield a tint which demonstrates excellent thermal stability.

SUMMARY OF THE INVENTION

Figure 1:
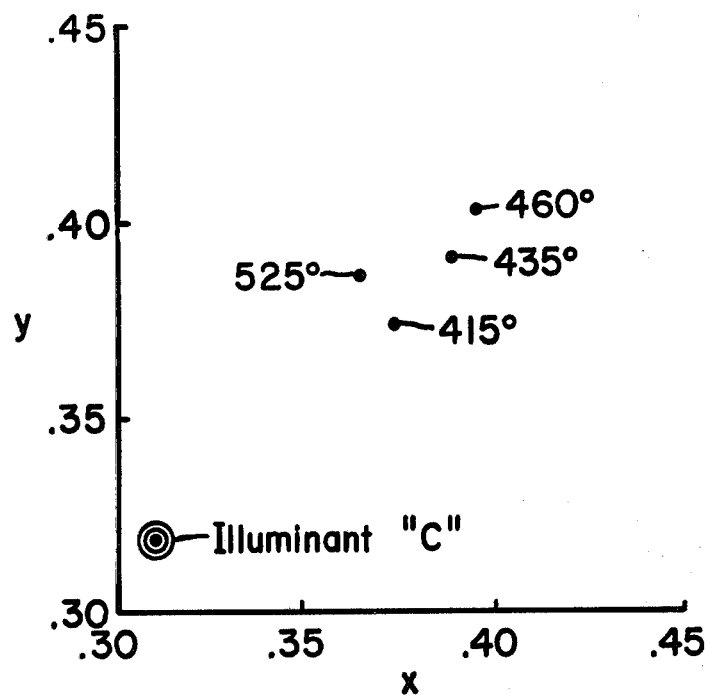
FIG. 1 presents a plot of chromaticity coordinates determined on several of the working examples reported hereinafter.

I have discovered that the above objectives can be achieved by subjecting photochromic glasses, wherein silver halide crystals comprise the photochromic agent and which contain lead oxide as a necessary component, to a strongly reducing gaseous environment at temperatures above the strain point of the glass and, preferably, at temperatures approximating or even somewhat exceeding the annealing point of the glass. At those elevated temperatures, not only are silver ions in the glass reduced to metallic silver, but lead ions therein are also reduced to metallic lead which is postulated to either coat or alloy with the reduced silver particles.

The inventive process appears to be applicable essentially irrespective of the base composition of the photochromic glass so long as AgCl, AgBr, and/or AgI crystals comprise the photochromic elements and there is an amount of lead oxide present therein which, when reduced in accordance with the inventive process, will provide the desired color. For example, U.S. Pat. No. 3,548,060 describes glasses having base compositions within the $Al_2O_3$-$B_2O_3$-RO system, i.e., the glasses consist essentially, by weight, of 30–86% $B_2O_3$, 2–35% $Al_2O_3$, and 12–45% of an alkaline earth metal oxide. U.S. Pat. No. 3,703,388 discusses glasses having base compositions within the $La_2O_3$-$B_2O_3$ field, i.e., the glasses consist essentially, by weight, of 15–75% $La_2O_3$ and 13–65% $B_2O_3$. U.S. Pat. No. 3,834,912 discloses glasses having base compositions within the PbO-$B_2O_3$ system, i.e., the glasses consist essentially, by weight, of 14.2–48% $B_2O_3$, 29–73% PbO, 0–15% alkaline earth metal oxides, and 0–23% $ZrO_2$, $Al_2O_3$, and/or ZnO. U.S. Pat. No. 3,876,436 is directed to glasses having base compositions within the $R_2O$-$Al_2O_3$-$P_2O_5$ field, i.e., the glasses consist essentially, by weight, of at least 17% $P_2O_5$, 9–34% $Al_2O_3$, not more than 40% $SiO_2$, not more than 19% $B_2O_3$, and at least 10% alkali metal oxides. U.S. Pat. No. 3,957,498 is drawn to glasses having base compositions within the $R_2O$-$Al_2O_3$-$SiO_2$ system, i.e., the glasses consist essentially, by weight, of 13–21% alkali metal oxides, 17–25% $Al_2O_3$, and 45–56% $SiO_2$. Finally, as was noted above in the discussion of U.S. Pat. No. 3,208,860, the presently commercially-marketed, photochromic glasses have base compositions within the alkali metal aluminoborosilicate system. That patent cites, as preferred compositions, glasses consisting essentially, by weight, of 4–26% Al- $_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8–25% $Rb_2O$, and 10–30% $Cs_2O$. Such glasses contain, by weight on the basis of chemical analysis, at least one halogen in the minimum effective proportion of 0.2% chlorine, 0.1% bromine, and 0.08% iodine, and a minimum of silver in the indicated proportion of 0.2% where the effective halogen consists of chlorine, 0.05% where the effective halogen is bromine, but the glass contains less than 0.08% iodine, and 0.03% where the glass contains at least 0.08% iodine. Where a transparent article is desired, the total silver will not exceed 0.7% and the total of the three recited halogens will not exceed 0.6%. The sum of the recited base glass constituents, silver, and halogens will compose at least 85% of the composition.

From laboratory investigations, I have determined that the minimum amount of lead, expressed in terms of PbO, required to provide the desired effect upon the transmittance when the glass is treated in accordance with my inventive process is at least 0.5% PbO and, most preferably, in excess of 1% PbO. A range of colors varying over the spectrum from bright yellow to hues approaching orange can be developed and close control of the color produced and the luminous transmittance of the glass is possible, thereby permitting excellent reproducibility of color shading. The actual color and luminous transmittance generated are somewhat dependent upon glass composition, notably PbO content, but are principally a function of the parameters of the reduction treatment.

Contrary to the statements in U.S. Pat. Nos. 3,892,582 and 3,920,463, the photochromic properties of the glasses are not seriously degraded so long as the reduction treatment temperature does not significantly exceed the annealing point of the glass for any substantial length of time. As judged empirically, temperatures much in excess of about 50° C. above the annealing point of the glass for times in excess of about one hour do appear to adversely affect the photochromic behavior.

An atmosphere of pure hydrogen has been found to be the most effective environment with regard to the speed of reaction. Hence, the reaction appears to be founded in a diffusion effect such that the coloration commences at the surface and moves inwardly. Because of this phenomenon, the longer the time and/or the higher the temperature employed, the deeper the coloration will penetrate into the glass. Moreover, the strong temperature dependence of this phenomenon permits a color gradient to be set up across the surface of the glass. Nevertheless, whereas pure hydrogen is preferred from the point of reaction speed, other considerations may suggest the substitution of other reducing environments such as carbon monoxide, cracked ammonia, and forming gas therefor. In general, then, the glass will be exposed to the gaseous reducing atmosphere at the prescribed temperatures for a period of time sufficient to reduce lead ions therein to metallic lead and allow formation of metal particle color centers, this time being dependent upon the composition of the glass, the environment utilized, and the temperature employed. For example, where pure hydrogen is used, an exposure period as brief as a few minutes may be adequate at the higher temperatures, while several hours may be required at temperatures near the strain point of the glass. Furthermore, of course, the depth of color penetration desired in the glass is a factor that must be considered, this depth being governed by the law of diffusion.

The inventive process permits the fabrication of semi-finished articles. For example, an ophthalmic lens blank can be finished (ground to the proper prescription and polished) on one face and the entire blank or only that face thereof exposed to the reducing environment for a period of time sufficient to develop an integral surface layer thereon containing metallic lead particles to provide the desired coloration therein. Subsequently, the final prescription will be ground into the previously-unfinished face of the blank. Whatever coloration was produced in the latter face would be removed during the finishing thereof, but the final lens would retain the coloration from the initially-finished face.

Because it is contemplated that the subject invention will have utility in producing photochromic ophthalmic lenses, i.e., ophthalmic lenses demonstrating reversible luminous transmittances, the preferred practice of this embodiment of the invention involves producing the inventive highly-absorbing surface layer on the rear face only of the lenses in order to avoid absorption of actinic radiation when the wearer steps out into the sunshine.

Although the inventive process is operable in glass systems where the PbO content is very high (29–73% PbO in U.S. Pat. No. 3,834,912, supra), the colorations derived from high PbO contents are not advantageously different from those of much lower PbO contents. It is required, however, to have at least 0.5% and, preferably, greater than 1% PbO present and silver halide crystals will constitute the photochromic agents. With the above-delineated preferred compositions of U.S. Pat. No. 3,208,860, the maximum PbO content will customarily not exceed about 10%.

It will be appreciated, as noted above, that the inventive process lends itself to producing shapes where only a portion of the area thereof is tinted or a gradient of color is developed across the area of an article. U.S. Pat. No. 4,072,490 illustrates apparatus and process which can be readily modified to serve the inventive process.

Further, the inventive process permits the production of colored photochromic glass bodies which are highly absorbing of ultraviolet radiations. These glasses are of particular utility when medically prescribed as ophthalmic lenses for such a malady as retinitis pigmentosa where protection from strong illumination and particularly ultra-violet radiation is essential. A two-step treatment is required to achieve that purpose. First, the photochromic glass is fired in a reducing atmosphere in accordance with the practice described in U.S. Pat. No. 3,892,582. That is, the glass is fired at a temperature and for a time sufficient to reduce $Ag^+$ ions to silver metal. The preferred method for carrying out that process contemplates the use of firing temperatures below the strain point of the glass. Thereafter, the so-treated glass is fired in a reducing environment at temperatures in the vicinity of the annealing point of the glass and higher for a sufficient period of time to reduce lead ions to metallic lead in a shallow surface layer. This sequential firing of the glass at different temperatures gives rise to a layer of metallic lead particles being formed over a layer of metallic silver particles. The silver particles cause a sharp cutoff in transmittance to occur at a wavelength of about 450 nm resulting in strong absorption in the blue portion of the visible spectrum and down into the ultraviolet. This circumstance renders the glass especially suitable as a filter for ultraviolet radiation.

However, even total absorption by silver particles cannot yield a low transmittance glass in the visible portion of the spectrum since the human eye is most sensitive to wavelengths at about 555 nm (yellow-green). In contrast, the lead particles absorb generally across the visible spectrum. Consequently, the luminous transmittance displayed by the glass is determined to a large extent by the thickness of the lead particle layer. In summary, this embodiment of the invention contemplates the production of photochromic glass articles, most commonly ophthalmic lenses, having an integral surface layer on the back glass thereof containing metallic silver and metallic lead particles. The method permits the production of such articles which absorb strongly in the ultraviolet portion of the spectrum and which demonstrate various color shades without resorting to hot glass forming processes.

Finally, it will be appreciated that, where desired, a known tinting agent for glass can be included in the composition. The combination of such a tint with the coloration produced via the inventive reducing treatment can, of course, yield a wide variety of color hues and shades.

RELATED APPLICATIONS

United States Application Ser. No. 95,435, filed concurrently herewith by N. F. Borrelli and B. M. Wedding, discloses coloring silver-containing glasses via heat treatment thereof in reducing environments at temperatures below the strain point of said glasses now U.S. Pat. No. 4,240,836.

United States Application Ser. No. 95,434, filed concurrently herewith by N. F. Borrelli, discloses a method for making selectively colored photochromic lenses utilizing an etching technique now U.S. Pat. No. 4,259,406.

DESCRIPTION OF THE PREFERRED EMBODIMENTS

The inventive process will be described utilizing three photochromic glasses which are commercially marketed by Corning Glass Works, Corning, New York for ophthalmic lenses. Approximate compositions of each are recited below in terms of weight percent. Glass A is marketed under the designation Corning 8097, Glass B is distributed under the Corning 8111, and Glass C is sold under the designation Corning 8105. Approximate values for the softening point (Soft.), annealing point (Ann.), and strain point (Str.) in ° C. are also reported for each glass.

|  | A | B | C |
|---|---|---|---|
| $SiO_2$ | 55.6 | 56.46 | 55.52 |
| $B_2O_3$ | 16.4 | 18.15 | 16.10 |
| $Al_2O_3$ | 8.9 | 6.19 | 8.90 |
| $Li_2O$ | 2.65 | 1.81 | 2.65 |
| $Na_2O$ | 1.85 | 4.08 | 1.83 |
| $K_2O$ | 0.01 | 5.72 | — |
| BaO | 6.7 | — | 6.70 |
| CaO | 0.2 | — | — |
| PbO | 5.0 | — | 5.04 |
| $ZrO_2$ | 2.2 | 4.99 | 2.07 |
| Ag | 0.16 | 0.207 | 0.175 |
| CuO | 0.035 | 0.006 | 0.0128 |
| Cl | 0.24 | 0.166 | 0.325 |
| Br | 0.145 | 0.137 | 0.50 |
| F | 0.19 | — | 0.2 |
| $TiO_2$ | — | 2.07 | — |
| Soft. | 675° | 662° | 675° |
| Ann. | 511° | 500° | 510° |
| Str. | 473° | 468° | 475° |

Circular lens blanks having a diameter of about 70 mm and a thickness of about 6 mm were pressed from Glass C, cut into quarters, and polished to a thickness of 3 mm. Two samples of each were placed into an electrically-heated tube furnace which was connected to a source of pure hydrogen. The furnace was purged with flowing nitrogen gas, filled with pure hydrogen gas, and the samples were then exposed at temperatures of 415° C., 435° C., 460° C., and 525° C. for 30 minutes to pure hydrogen flowing at a rate of about 10 cc/second with a pressure slightly in excess of atmospheric pressure. After removal from the furnace, the samples were polished on one side to provide a thickness of 2 mm and one set of specimens was chemically strengthened by immersion for 16 hours in a bath of molten 60% $KNO_3$.40% $NaNO_3$ (by weight) operating at 400° C.

Undarkened color and photochromic properties were determined utilizing a conventional tristimulus colorimeter and laboratory exposure/photometer system. Each sample was exposed to the source of ultraviolet radiation for 20 minutes at room temperature, i.e., about 20°–25° C., and then removed from the radiation for five minutes. Table I records the luminous transmittances exhibited by each sample before darkening ($T_o$), after darkening for 20 minutes ($T_{D20}$), and after fading for five minutes ($T_{F5}$). Table I also lists the chromaticity coordinates (x,y) of the undarkened specimens.

Figure 2:
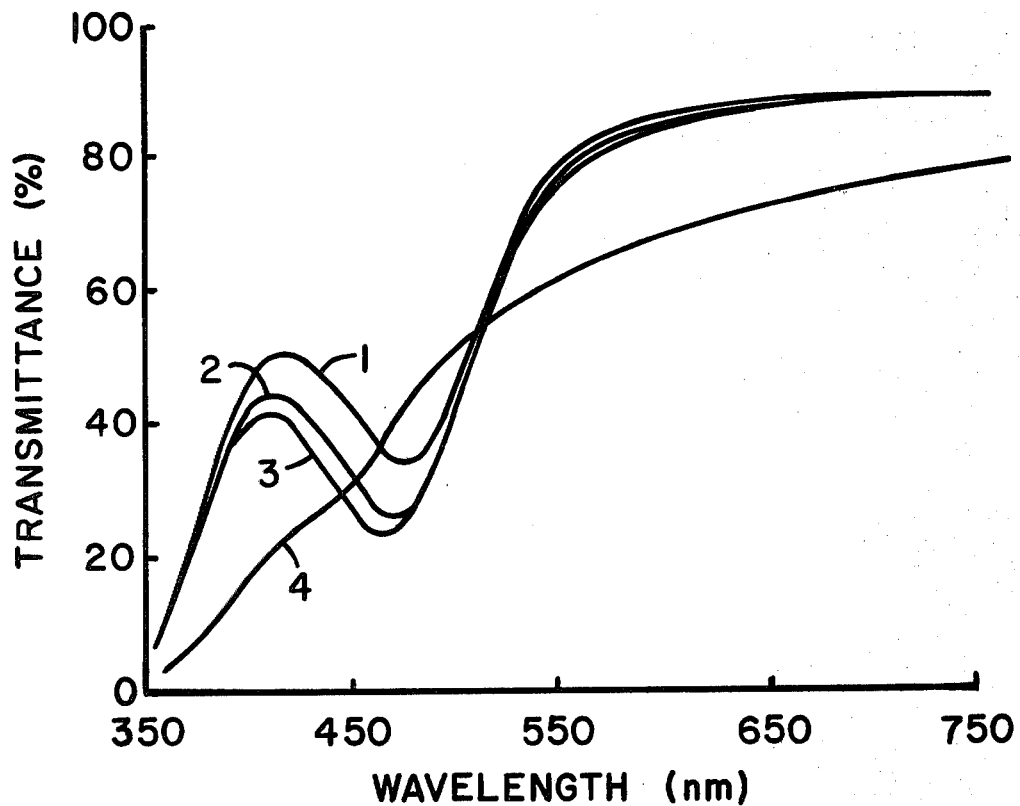
FIG. 2 delineates several spectral transmittance curves measured spectrophotometrically on several of the working embodiments recorded hereinafter.

FIG. 1 plots the chromaticity coordinates of the undarkened glasses on a color mixture diagram and FIG. 2 records the spectral transmittances of the chemically strengthened (chem. stren.) samples after being thermally faded, i.e., after heating for 35 minutes at 97° C.

TABLE I

|  | Hydrogen Treatment | Chem. Stren. | $T_o$ | $T_{D20}$ | $T_{F5}$ | x | y |
|---|---|---|---|---|---|---|---|
| Example 1 | 415° C. | — | 75 | 20 | 36 | 0.3768 | 0.3803 |
| Example 2 | 435° C. | — | 75 | 20 | 36 | 0.3830 | 0.3886 |
| Example 3 | 460° C. | — | 75 | 20 | 35 | 0.3862 | 0.3993 |
| Example 4 | 525° C. | — | 59 | 33 | 40 | 0.3534 | 0.3694 |
| Example 1 | 415° C. | + | 75 | 20 | 36 | 0.3734 | 0.3737 |
| Example 2 | 435° C. | + | 73 | 20 | 36 | 0.3886 | 0.3923 |
| Example 3 | 460° C. | + | 73 | 20 | 36 | 0.3949 | 0.4040 |
| Example 4 | 525° C. | + | 61 | 32 | 41 | 0.3651 | 0.3845 |

A comparison of Example 4 with the other Examples in Table I and in FIGS. 1 and 2 immediately demonstrates substantial differences existing therebetween. The spectral transmittance curves set forth in FIG. 2 are especially instructive. The treatment at 525° C. (above the annealing point of the glass) in a hydrogen atmosphere was high enough to cause reduction of lead in addition to reducing the silver ions. This reaction caused the glass to become absorbing throughout the visible portion of the radiation spectrum and led to the loss of the sharp absorption band which peaks beyond 450 nm and is definitive of silver metal particles. The reduction of the lead ions also produces a color-shift towards green.

A comparison of the color and photochromic properties exhibited by the specimens chemically strengthened and those not subjected to that treatment clearly indicates that the inventive process is not adversely affected thereby.

Circular lens blanks similar to those described above with respect to Glass C were pressed from Glass A, cut into quarters, and ground and polished to a cross section of about 3 mm. The samples were thereafter fired in an atmosphere of pure flowing hydrogen for 0.5 hour at temperatures of 400° C., 455° C., 480° C., and 530° C., utilizing the apparatus and technique outlined above.

Color and photochromic properties were again determined on specimens polished from one side to a thickness of about 2 mm using the above-described method and apparatus. Each sample was exposed to ultraviolet radiation for 20 minutes at room temperature and subsequently removed from the exposure for five minutes. Table II records the luminous transmittances displayed by each specimen before darkening under ultraviolet radiation ($T_o$) and the chromaticity coordinates (x,y) of the undarkened specimens.

Figure 3:
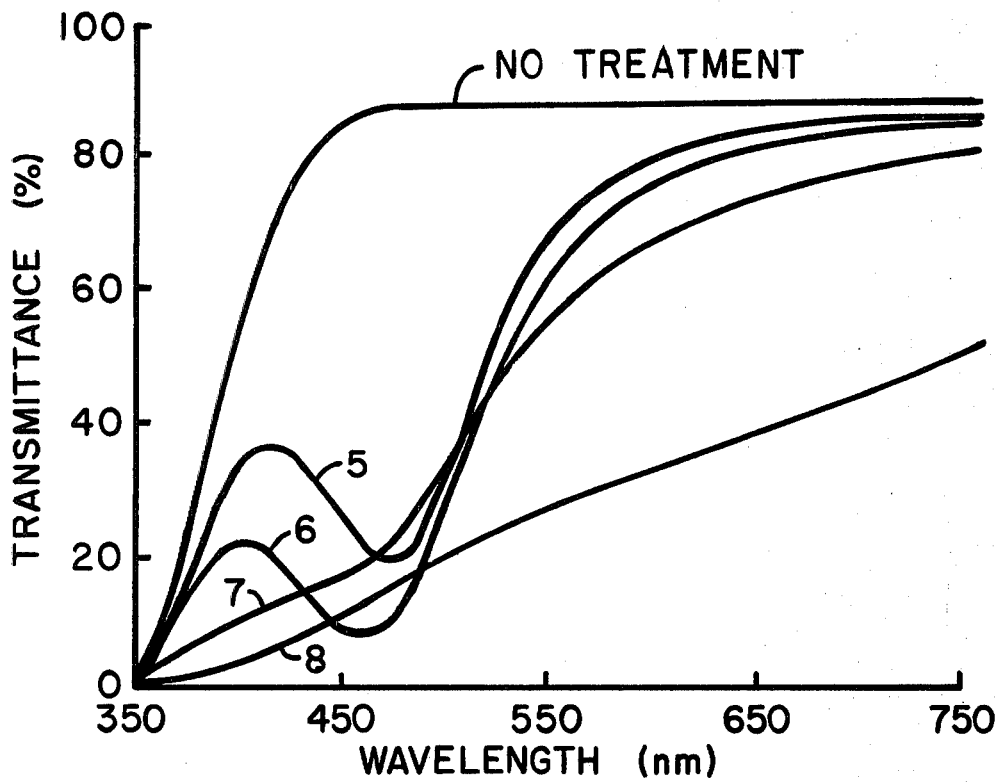
FIG. 3 depicts a plot of chromaticity coordinates determined on several of the illustrative examples recited hereinafter.

FIG. 3 graphically illustrates the spectral transmittances of the undarkened samples. FIG. 3 also records the spectral transmittance curve of a specimen which had received no reducing environment treatment whatever.

TABLE II

| Example No. | Hydrogen Treatment | $T_o$ | x | y |
|---|---|---|---|---|
| 5 | 400° C. | 65.9 | 0.4080 | 0.3954 |
| 6 | 455° C. | 60.9 | 0.4467 | 0.4427 |
| 7 | 480° C. | 56.5 | 0.4153 | 0.4190 |
| 8 | 530° C. | 27.8 | 0.4049 | 0.4063 |

Table II makes apparent the relatively small color change, but large shift in luminous transmittance, which takes place between 480° C. and 530° C. FIG. 3 notes the strong absorption peaks between about 450–500 nm representative of the presence of silver particles in the curves for the 400° C. and 455° C. treatments. That phenomenon loses its identity at higher treatment temperatures and is replaced by a structureless absorption throughout the visible wavelengths which decreases as the wavelength increases. Thus, a longer hold at 480° C. (slightly above the strain point of the glass) would remove the absorption relic observed in the curve.

Lens pressings of Glass A and Glass B were quartered and polished to a thickness of 2 mm. The specimens were fired for 5, 10, 20, and 40 minutes in an atmosphere of pure flowing hydrogen at a temperature of 520° C., i.e., about 50° C. above the strain point of the glass, employing the equipment and process described above. The luminous transmittances exhibited by each specimen before darkening under ultraviolet radiation ($T_o$), the chromaticity coordinates (x,y), and color purity (%) were determined utilizing the apparatus and technique described above. Those data are reported in Table III.

TABLE III

| Example No. | Treatment Glass | Time | $T_o$ | Color x | y | Purity |
|---|---|---|---|---|---|---|
| 9 | A | 5 | 77.7 | 0.3832 | 0.4130 | 46 |
| 10 | A | 10 | 72.2 | 0.3980 | 0.4236 | 50 |
| 11 | A | 20 | 63.8 | 0.4084 | 0.4296 | 52 |

TABLE III-continued

| Example No. | Treatment Glass | Time | $T_o$ | Color x | y | Purity |
|---|---|---|---|---|---|---|
| 12 | A | 40 | 55.7 | 0.4196 | 0.4316 | 54 |
| 13 | B | 5 | 81.2 | 0.3802 | 0.4211 | 47 |
| 14 | B | 10 | 78.3 | 0.4033 | 0.4525 | 62 |
| 15 | B | 20 | 76.2 | 0.4197 | 0.4700 | 70 |
| 16 | B | 40 | 72.7 | 0.4343 | 0.4813 | 73 |

Figure 4:
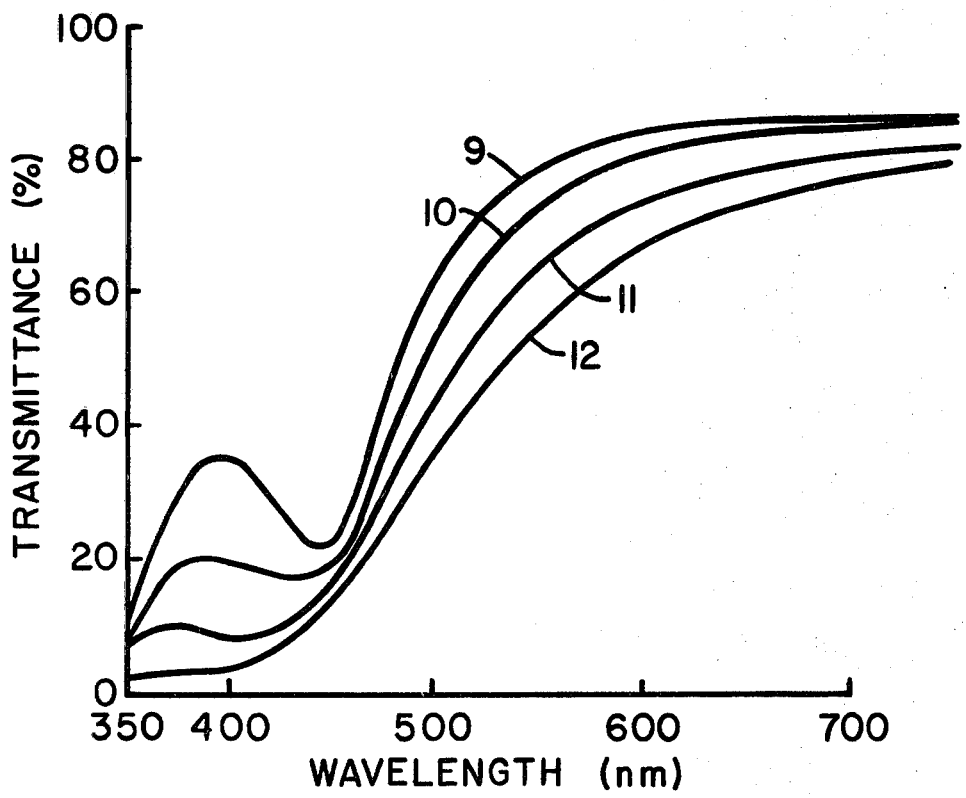
FIG. 4 sets forth a plot of chromaticity coordinates calculated on several working embodiments discussed hereinafter.
Figure 5:
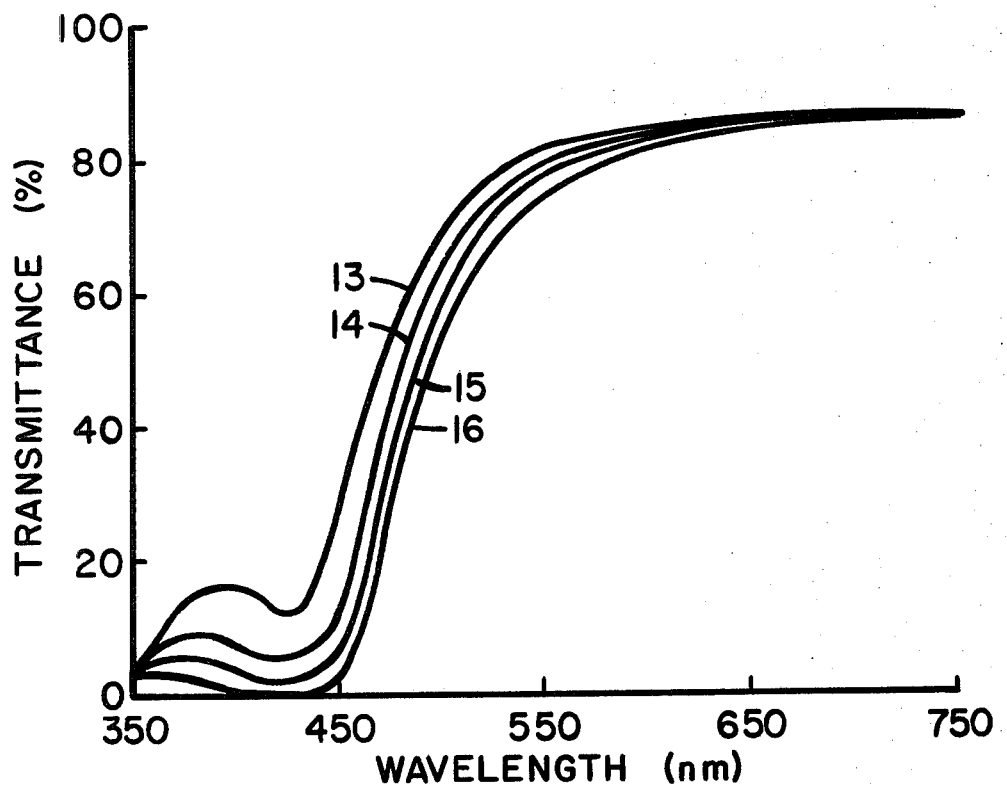
FIG. 5 includes several spectral transmittance curves measured spectrophotometrically on several of the illustrative examples reported hereinafter.

FIG. 4 plots the visible transmittance spectra of Examples 9–12 and FIG. 5 records the transmittance spectra of Examples 13–16.

A comparison of Examples 9–12 (a lead-containing glass) with Examples 13–16 (a non-lead glass) points up three significant differences:

(a) the non-lead glass displays no extinction of the silver band in the transmittance spectrum after relatively long hydrogen firing;

(b) the non-lead glass loses very little transmittance at long wavelengths even after relatively long hydrogen firing; and (c) the non-lead glass demonstrates rather large changes in chromaticity accompanied with relatively small changes in luminous transmittance.

Those distinctions dramatically illustrate the substantive effect which the reduction of lead ions to metallic lead particles has upon the color and transmittance of the glass. The above data and the curves of FIG. 5 underscore the capability of the inventive method to closely control the shades developed in glasses containing both silver and lead.

Lens blanks of Glass C were ground and polished on the back surface to the desired curvature, thereby preparing semi-finished lenses. Pairs of lenses were prepared utilizing the following firing schedules in an atmosphere of pure hydrogen:

(a) 22 hours at 420° C. plus one hour at 560° C. (Example 17); and (b) 22 hours at 460° C. plus 0.5 hour at 560° C. (Example 18). The front surface was thereafter ground and polished to yield a lens having a cross section of about 3 mm. In the resulting lens, all tinting is provided via a thin layer in the back surface. Accordingly, the photochromic performance of the glass is not affected.

Figure 6:
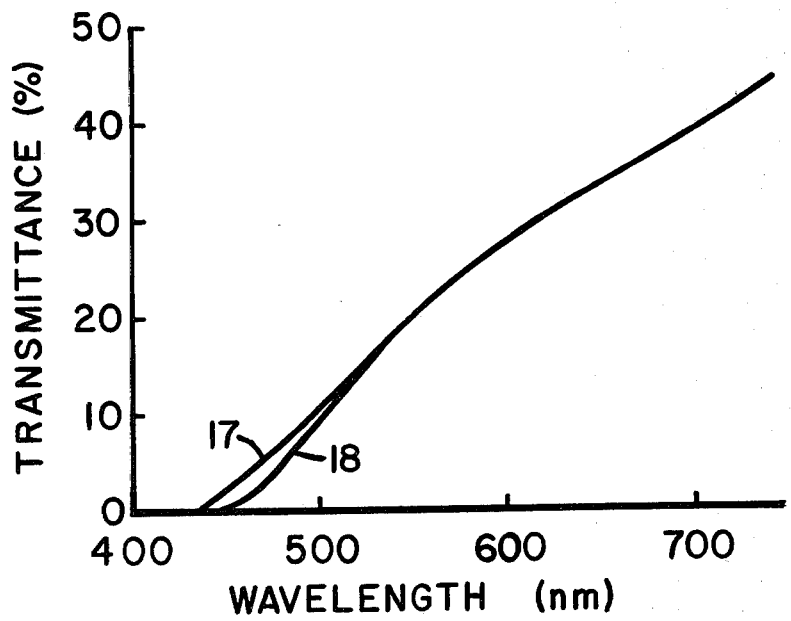
FIG. 6 comprises a plot of the spectral transmittance coefficients for two of the working examples discussed hereinafter.

FIG. 6 comprises a plot of the spectral transmittance coefficients for Examples 17 and 18. Example 17 cuts slightly more blue radiation than does Example 18. This difference is believed to be because the long term exposure at 460° C., even though below the strain point of the glass, was sufficient to effect some reduction of lead ions to metallic lead which, in turn, modified the silver absorption. Stated in another way, the double firing practice caused strong absorption by silver in a deep layer to thereby remove transmittance at wavelengths below about 450 nm. The higher temperature employed in the second step reduced the overall luminous transmittance of the glass.

I claim:

1. A method for producing different shades of a yellow to orange tint in a surface layer in a transparent photochromic glass article, the differences in shade being due to a major variation in luminous transmittance of the glass with a minor shift in the chromaticity thereof and the hues of which will remain essentially unchanged after subsequent heat treatments up to about the strain point of the glass, said photochromic glass containing crystals selected from the group of silver chloride, silver bromide, and silver iodide as the photochromic agents and containing at least 0.5% lead, expressed as PbO, in the composition thereof, said method comprising exposing at least a portion of said photochromic article to a gaseous reducing environment at a temperature ranging from about the strain point to about 50° C. above the annealing point of the glass for a time of at least 0.5 hour to cause in the surface of said glass silver ions to be reduced to metallic silver particles and lead ions to be reduced to metallic lead particles which either coat or alloy with the metallic silver.

2. A method according to claim 1 wherein said gaseous reducing environment consists of pure hydrogen.

3. A method according to claim 2 wherein said time ranges from 0.5 hour to several hours.

4. A method according to claim 1 wherein a gradient coloration is produced in said glass article across the surface thereof.

5. A method according to claim 1 wherein a tinting agent is incorporated into the glass composition.

6. A method according to claim 1 wherein the base composition for said glass consists essentially, expressed in weight percent on the oxide basis, of about 0.5–10% PbO, 4–26% $Al_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8–25% $Rb_2O$, and 10–30% $Cs_2O$.

7. A method for producing different shades of a yellow to orange tint in a surface layer in transparent photochromic glass articles, said differences in shade being due to a major variation in luminous transmittance of the glass with a minor shift in the chromaticity thereof and the hues of which will remain essentially unchanged even after subsequent heat treatments up to about the strain point of the glass, said photochromic glass being highly absorbing of ultraviolet radiations and the blue portion of the visible spectrum and containing crystals selected from the group of silver chloride, silver bromide, and silver iodide as the photochromic agents and containing at least 0.5% lead, expressed as PbO, in the composition thereof, said method comprising the steps of:

(a) exposing at least a portion of said photochromic glass article to a gaseous reducing environment at a temperature below the strain point of said glass for a time sufficient to cause silver ions in the surface of said glass to be reduced to metallic silver particles, and, thereafter, (b) subjecting said previously-exposed portion of said photochromic glass article to a gaseous reducing environment at a temperature ranging from about the strain point of the glass to about 50° C. above the annealing point of the glass for a time of at least 0.5 hour to cause the reduction of lead ions in the surface of said glass to metallic lead particles as a layer over the metallic silver particles.

8. A method according to claim 7 wherein said gaseous reducing environment consists of pure hydrogen.

9. A method according to claim 7 wherein a gradient coloration is produced in said glass article across the surface thereof.

10. A method according to claim 7 wherein a tinting agent is incorporated into the glass composition.

11. A method according to claim 7 wherein the base composition for said glass consists essentially, expressed in weight percent on the oxide basis, of about 0.5–10% PbO, 4–26% $Al_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8–25% $Rb_2O$, and 10–30% $Cs_2O$.

* * * * *

UNITED STATES PATENT AND TRADEMARK OFFICE
CERTIFICATE OF CORRECTION

PATENT NO. : 4,290,794

DATED : September 22, 1981

INVENTOR(S) : Brent M. Wedding

It is certified that error appears in the above-identified patent and that said Letters Patent are hereby corrected as shown below:

Column 1, line 31, change "explicity" to -- explicitly --.

Column 1, line 34, change "additive" to -- addition --.

Column 1, line 58, change "explicity" to -- explicitly --.

Column 9, Table III, Column 2, line 65, "Treatment Glass" should read just -- Glass --.

Column 9, Table III, Column 3, "Time" should read -- Treatment Time --.

Column 9, Table III, Column 6, "Color y" should read just -- y --.

Column 9, Table III, Column 7, "Purity" should read -- Color Purity --.

Column 10, Table III, line 2, "Treatment Glass" should read just -- Glass --.

Column 10, Table III, Column 3, "Time" should read -- Treatment Time --.

Column 10, Table III, Column 6, "Color y" should read just -- y --.

UNITED STATES PATENT AND TRADEMARK OFFICE
CERTIFICATE OF CORRECTION

PATENT NO. : 4,290,794

DATED : September 22, 1981

INVENTOR(S) : Brent M. Wedding

It is certified that error appears in the above–identified patent and that said Letters Patent are hereby corrected as shown below:

Column 10, Table III, Column 7, "Purity" should read -- Color Purity --.

Signed and Sealed this

Twentieth Day of April 1982

[SEAL]

Attest:

GERALD J. MOSSINGHOFF

*Attesting Officer*   *Commissioner of Patents and Trademarks*